May 31, 1932.　　　　J. A. COTTON　　　　1,860,355
VALVE LEAD CONTROL FOR VALVE GEAR MECHANISM
Filed Feb. 14, 1929　　　4 Sheets-Sheet 3
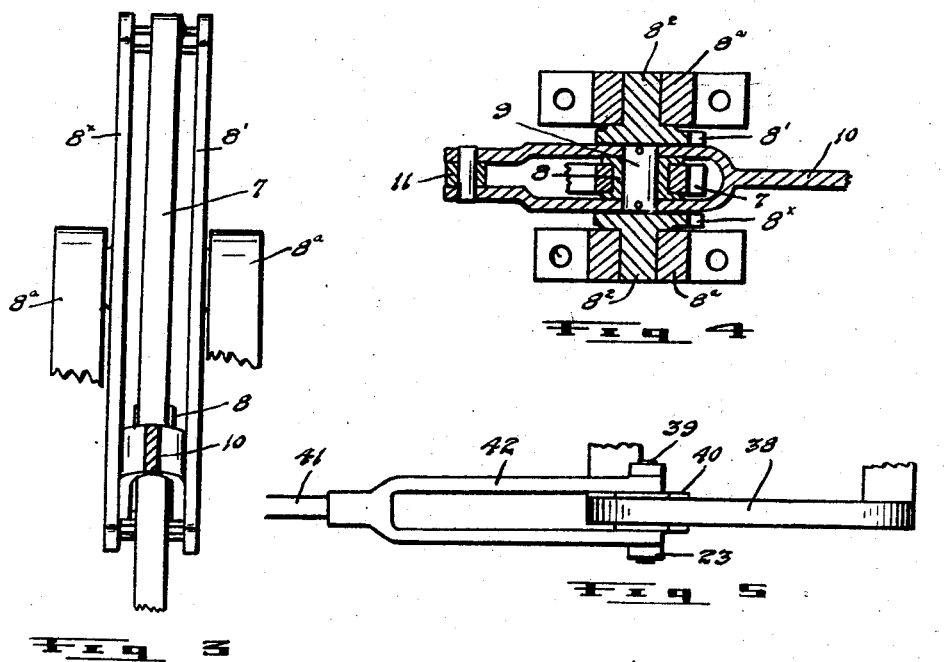
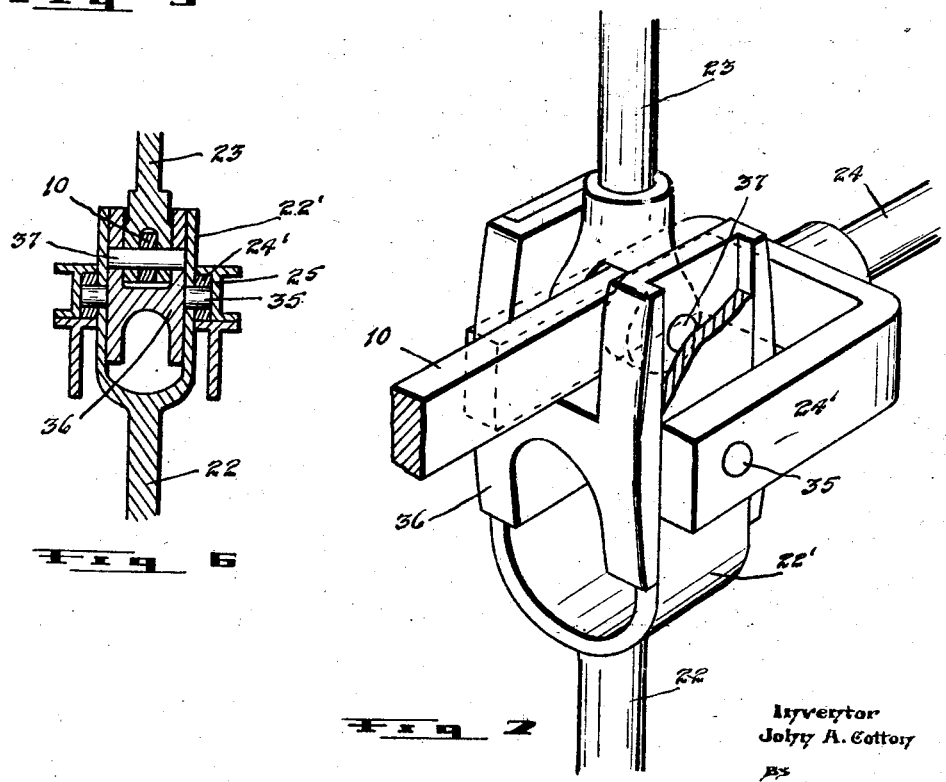
Inventor
John A. Cotton May 31, 1932.  J. A. COTTON  1,860,355
VALVE LEAD CONTROL FOR VALVE GEAR MECHANISM
Filed Feb. 14, 1929  4 Sheets-Sheet 4
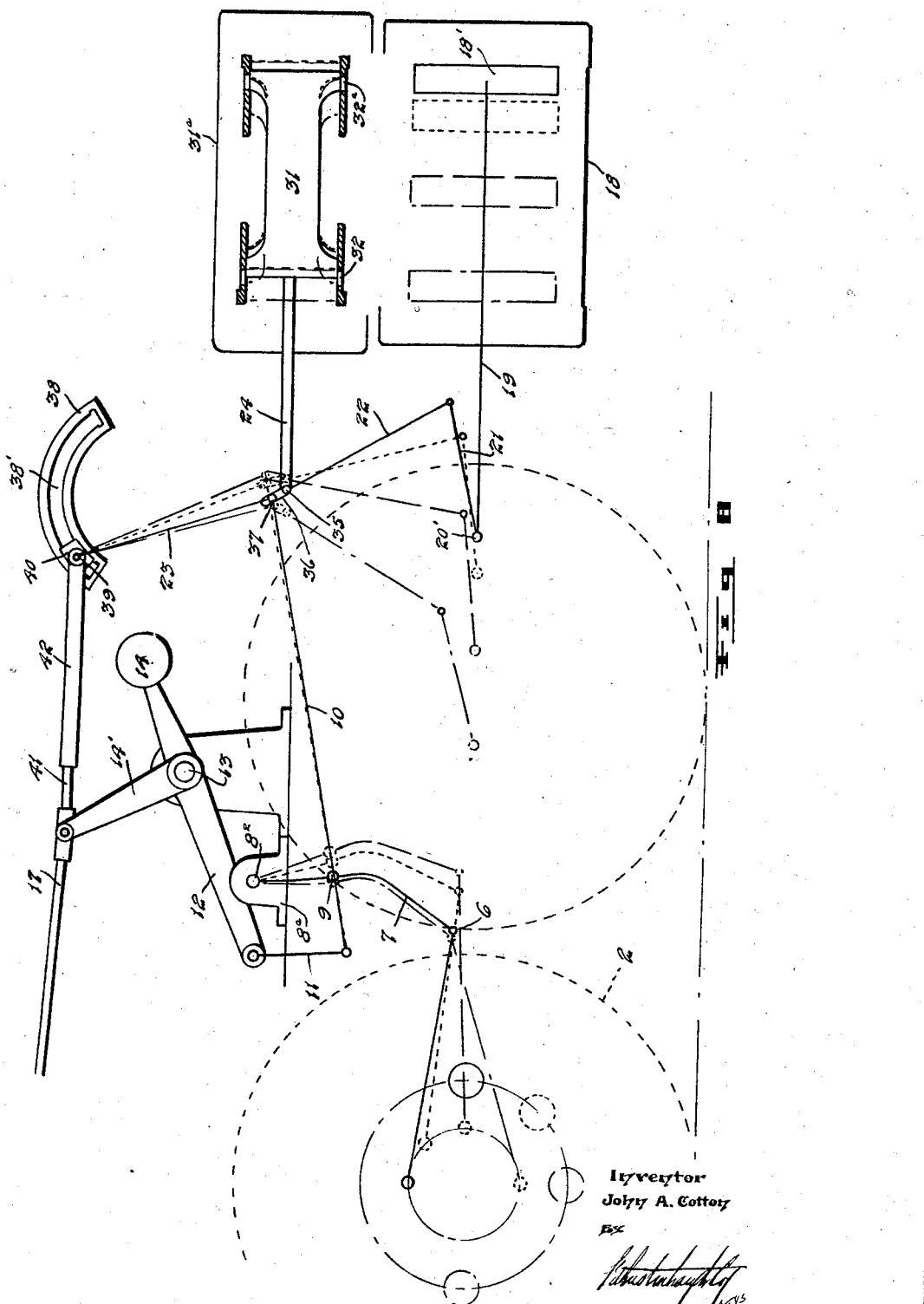
Inventor
John A. Cotton Patented May 31, 1932

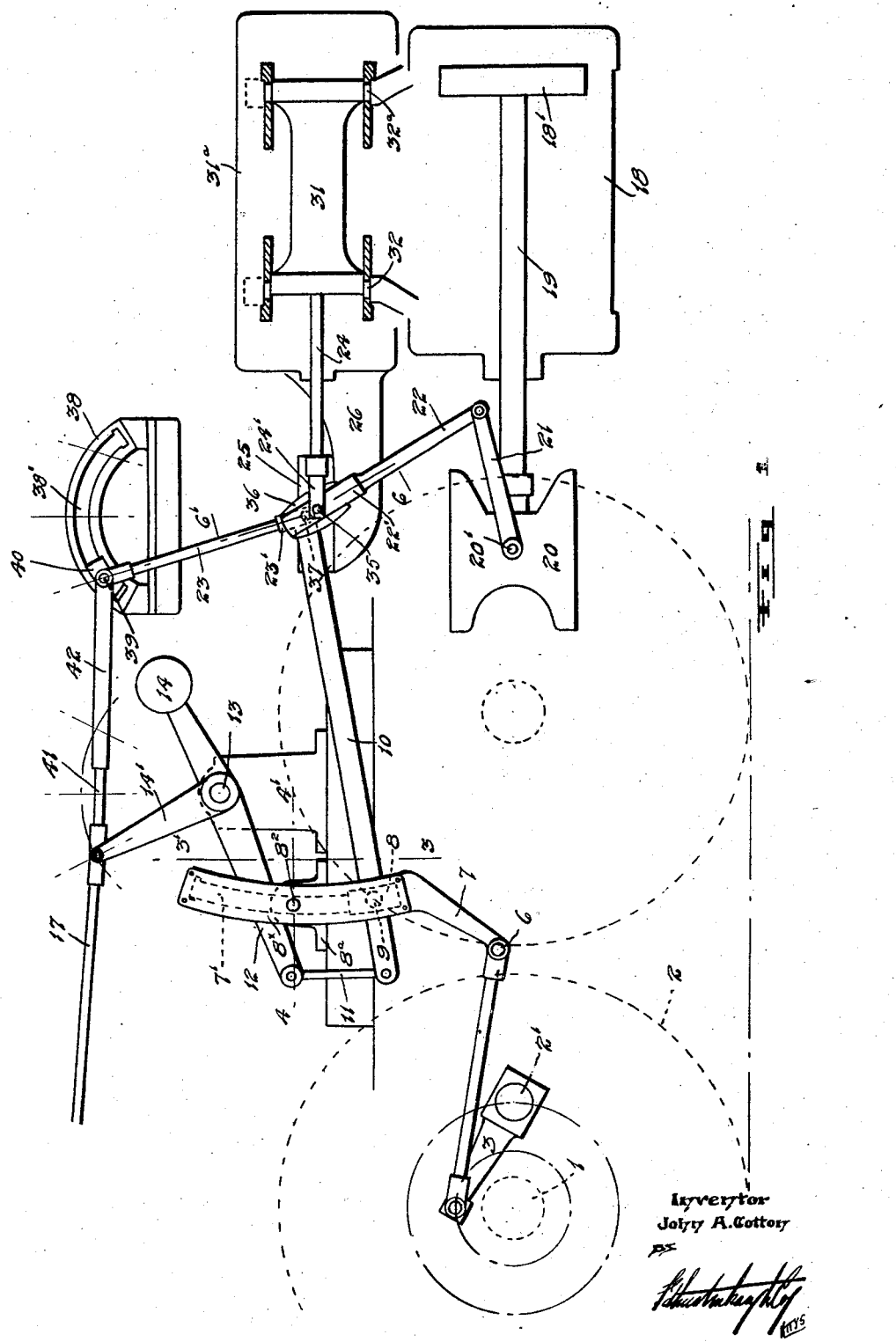

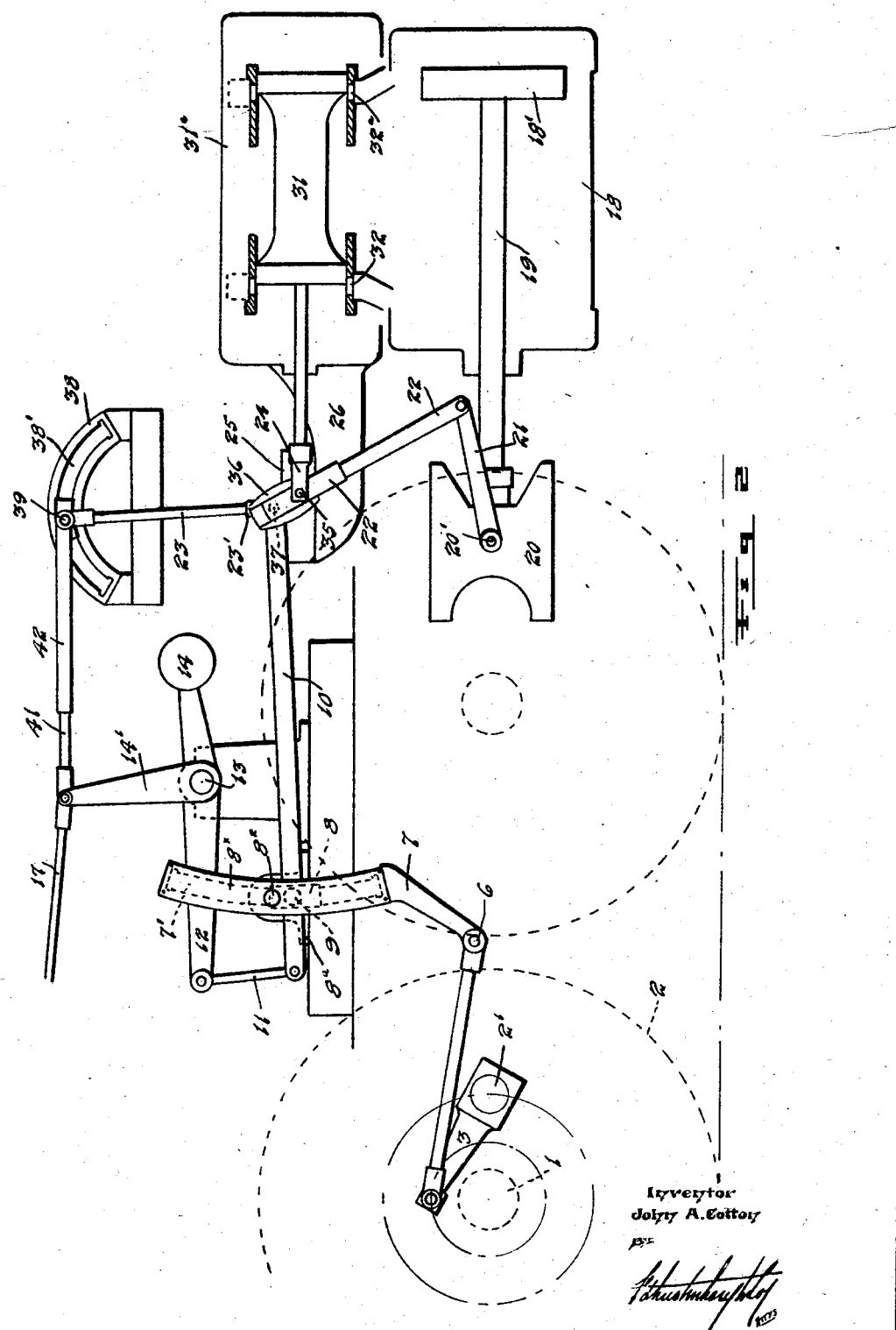

1,860,355

UNITED STATES PATENT OFFICE

JOHN A. COTTON, OF CALGARY, ALBERTA, CANADA

VALVE LEAD CONTROL FOR VALVE GEAR MECHANISM

Application filed February 14, 1929, Serial No. 339,921, and in Canada February 22, 1929.

The invention relates to improvements in valve lead control for valve gear mechanism and more particularly to valve mechanism for locomotives and especially to that type of locomotive equipped with the well known Walschaert valve gear.

An object of the invention is to provide a valve gear construction that will positively insure that the locomotive will start when the reversing gear is moved to either of its extreme forward or back positions, such being brought about by supplying a steam distribution in the right and left engine cylinders and controlled by the steam valves to give a maximum starting effort.

In the accompanying drawings, wherein my invention appears as utilized in the Walschaert valve gear, Fig. 1 is a view showing the Walschaert valve gear with my invention introduced, and the parts in the positions occupied when the locomotive is to be started.

Fig. 2 is a view similar to Figure 1 with the various parts shown as they appear in a running condition of the locomotive, the main crank pin being shown in the same position as selected in Figure 1.

Fig. 3 is an enlarged vertical sectional view at 3—3' Figure 1.

Fig. 4 is a horizontal sectional view at 4—4' Figure 1 with the sliding link block raised to bring the pin thereof into alignment with the trunnions of the side plates.

Fig. 5 is an enlarged detailed plan view of the control link and associated parts.

Fig. 6 is an enlarged vertical sectional view at 6—6' Figure 1.

Fig. 7 is a perspective view of the parts appearing in Figure 6, portions being broken away to expose construction.

Fig. 8 is a view showing diagrammatically various positions of the valve in relation to the various postions of the main driving crank pin, the reversing gear being set in the position occupied when moved to start the locomotive.

In the drawings like characters of reference indicate corresponding parts in the several figures.

As before intimated, I have shown my invention as utilized in a Walschaert valve gear and as such gear is universally adopted by railroads and consequently universally known, I have not considered it necessary to give a detailed description of the parts or of their action. The Walschaert valve gear embodies in its assembly, parts shortly described which are associated with the indicated well known locomotive parts.

The main driving axle 1 of the locomotive carries the drive wheel 2 fitted with the selectively positioned crank pin 2'. To the crank pin, an eccentric arm 3 is permanently secured and this arm is pivotally connected to the toe 6 of the motion link 7. The motion link presents as is usual an elongated arcuate slot 7' slidably receiving the link block 8 and the link block is carried by a cross pin 9 supported by the forked rear extremity of the radius rod 10. The motion link is attached by suitably located and spaced, upper and lower sets of pins to side plates $8^x$ and 8' spaced from the inner and outer sides of the link block. The plates carry axially aligned trunnions $8^2$ which are rotatably mounted in fixed side bearings $8^a$ permanently fastened to an adjacent fixed part of the locomotive body.

The rear end of the radius rod 10 is connected pivotally to the back radius rod hanger 11 which in turn is pivotally attached to the rear end of the lower tumbling shaft arm 12. The said tumbling arm is permanently fastened to one end of the tumbling shaft 13, this shaft passing across from one side of the locomotive to the other. The tumbling shaft is counter balanced by a weight 14 provided and it is also supplied with an upstanding arm 14' which is connected pivotally to the forward end of the reach rod 17 which latter rod is directly connected in the cab in the usual manner to the conventional reversing lever (not shown).

The engine cylinder 18 contains the customary piston 18' having the extending connecting rod 19 thereof rearwardly attached to the usual crosshead 20. The crosshead carries a wrist pin 20' on which is pivotally mounted the rear end of a union link 21 having the forward end thereof pivotally attached to the upstanding combination lever 22. The piston valve 31 operating in the steam chest 31ª in the usual manner controls the admission and exhaust of the steam to and from the cylinders through the ports 32 and 32ª. The customary valve rod 24 has the rear end thereof provided with a crosshead 24' slidably carried by opposing guides 25 formed at the rear end of a bracket 26 extending from and integrally cast with the steam chest head.

In the Walschaert valve gear previously mentioned, the combination lever, the valve rod and the radius rod are non-adjustably connected in a manner not herein disclosed and by virtue of such connection, the piston valve is maintained set with a non-variable lead or preadmission, In Figure 1 of the drawings, I have shown the various working parts as appearing on the right side of the locomotive but it is to be understood that all the parts hereinbefore described with the exception of the tumbling shaft 13, the reach rod and the weight are duplicated at the remote or left hand side of the locomotive, the tumbling shaft making the connection between the opposite sides and also that all such parts with the exception of the duplicate of the arm 14' are now in common use and form part of the equipment of the Walschaert valve gear. In installing my invention in the Walschaert valve gear, I change the connection between the valve rod, the radius rod and the combination lever and substitute parts shortly described.

In introducing my invention, I do not materially alter the design of the valve rod crosshead, other than slightly changing its dimensions and I alter the structure of the upper end of the combination rod.

The valve rod or stem crosshead is as before described slidably carried for horizontal reciprocating movement in the guides of the bracket 26 and the said cross head pivotally receives outstanding trunnions 35 formed at the sides of the forked upper end 22' of the combination lever 22. The forked sides of the combination lever provide opposing vertically extending guides for a link block 36, the upper end of which is fitted with a cross pin 37. The forward end of the radius rod is centrally and pivotally mounted on the pin 37 and on the pin 37 I also mount rotatably the forked lower end 23' of the control link hanger 23 which has the upper end thereof forked to span the control link 38 and the forked ends carrying a pin 39 passing centrally through the control link block 40 slidably mounted in the arcuate slot 38' of the control link.

To the upper end of the arm 14', I pivotally connect a rod 41 which has the forward end thereof forked at 42 and the forks spanning the control link block and pivotally mounted on the pin 39. The above arrangement is such that the control link block is directly under the influence of the reach rod 17 and here I wish to explain that the control link 38 is permanently fastened in any suitable manner to a fixed part of the locomotive body.

The various parts of my invention as hereinbefore described are duplicated at the remote side of the locomotive to that shown and in order to actuate such duplicate parts in unison with those shown, the remote end of the tumbling shaft is provided with an upstanding arm identical to that 14' and to which is connected pivotally the rear end of the duplicate rod corresponding to that 41.

The radius of the link 38 is chosen in designing the same with due regard to the lead or pre-admission given the engine valve on which the link is to be used and with the object of dispensing with the lead at the time that the engine is to be started and also of initially quickly returning the lead or pre-admission subsequent to starting and finally slowly returning it until the maximum lead is obtained for effective and efficient running conditions.

According to the structure disclosed and considering particularly those added parts constituting my invention, it will be apparent that when the engine is at a standstill and it is started by manipulating the reversing gear in the proper direction, the movement of the reversing gear will effect the customary movements in the valve link mechanism shown and also a movement in the control block 40 which carries the control hanger 23. When the reversing gear is moved to say its extreme forward or rear position, the block 40 moves ahead or back and in so moving permits a dropping of the pin 37 which is connected to the forward end of the radius rod and which in dropping approaches the aligned longitudinal axes of the trunnions 35 which are carried by the rear end of the reciprocating valve stem.

The movement of the pin 37 towards the said trunnions decreases the travel of the valve and the limited down position of the pin 37 is designed such that when in such position, the lead or pre-admission given the valve is entirely dispensed with and that when it is in its extreme up position, the valve has its maximum lead as required for effective and efficient running conditions of the engine.

I wish to particularly point out also in regard to the link 38 that the arrangement is such that in the return movement of the block 40 to its central position, the travel of the pin 37 in a direction away from the trunnions 35 will be initially quick and then gradually slowed up as it approaches its uppermost position and this is desirable as the lead of the valve is quickly initially restored.

In the drawings, I have shown the well known inside admission valve and with such type of valve, the curvature of the link 39 is as shown. Should, however, an outside admission valve be used and as quite often occurs in locomotive engines, the link 38 is reversed, that is to say, the centre point of the radius of curvature is above the link instead of below as herein shown.

In this latter arrangement, the forks or guides of the combination lever 22 will be sufficiently long to permit the link block to take a position such that the pin 37 is at all times below the trunnions 35 and such accordingly requires a rising movement of the hanger 23 to bring the axis of the pin 37 towards the aligned axes of the trunions 35.

What I claim as my invention is:—

In a locomotive valve gear mechanism, the combination with the forked rear end of the valve rod, the forked upper end of the combination lever pivotally attached to the forked end of the valve rod and the radius rod, of a block mounted between the forked ends of the combination lever and slidably carried thereby to move in a direction radial to the pivot connection between the combination lever and the valve rod, a pivot pin connecting the radius rod to the sliding block, a stationary control link having an arcuate slot therein, a link block slidably mounted in the slot, a hanger having the ends thereof pivotally connected to the blocks and an operating connection between the control link block and the reach rod of the reversing gear of the valve gear mechanism, said control link and associated parts being positioned such that when the reversing gear is moved to its forward or rear positions, the radius rod pivot pin will be moved into axial alinement with the pivot connection between the valve rod and the combination lever.

Signed at Winnipeg, this 12th day of October, 1928.

JOHN A. COTTON.